United States Patent
Buyukdura et al.

(10) Patent No.: US 10,708,836 B1
(45) Date of Patent: Jul. 7, 2020

(54) USER EQUIPMENT ROUTE SELECTION ACROSS MULTIPLE MOBILE COMMUNICATION TECHNOLOGIES

(71) Applicant: AT&T Intellectual Property I, L.P., Atlanta, GA (US)

(72) Inventors: Feza Buyukdura, Fairview, TX (US); Ryan Redfern, Cerritos, CA (US); Hugh Shieh, Sammamish, WA (US); Jeffrey D. Hjort, Lynnwood, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/370,878

(22) Filed: Mar. 29, 2019

(51) Int. Cl.
*H04M 3/00* (2006.01)
*H04W 36/22* (2009.01)
*H04W 48/18* (2009.01)
*H04W 48/16* (2009.01)

(52) U.S. Cl.
CPC .......... *H04W 36/22* (2013.01); *H04W 48/16* (2013.01); *H04W 48/18* (2013.01)

(58) Field of Classification Search
CPC ...... H04W 36/22; H04W 48/18; H04W 48/16
USPC ........................................................ 455/419
See application file for complete search history.

(56) References Cited

U.S. PATENT DOCUMENTS

2018/0279218 A1* 9/2018 Park ..................... H04W 36/08
2018/0324577 A1* 11/2018 Faccin .................... H04W 8/06

OTHER PUBLICATIONS

Sparks, et al."5G Network Slicing Whitepaper" FCC Technological Advisory Council 5G IoT Working Group, Feb. 19, 2018. [https://transition.fcc.gov/bureaus/oet/tac/tacdocs/reports/2018/5G-Network-Slicing-Whitepaper-Finalv80.pdf], 34 pages.

* cited by examiner

*Primary Examiner* — Marcos Batista
(74) *Attorney, Agent, or Firm* — Amin, Turocy & Watson, LLP

(57) ABSTRACT

The described technology is generally directed towards enabling user equipment to perform route selection across multiple mobile communication technologies. User equipment route selection allows specifying, by the user equipment, information which affects the way the user equipment's network communications are handled by a communication network. User equipment route selection across multiple mobile communication technologies enables certain route selection capabilities whether the user equipment is connected to a 5G Core network mobile communication technology, a 5G Option 3x network mobile communication technology, or a LTE network mobile communication technology.

20 Claims, 9 Drawing Sheets

US 10,708,836 B1

USER EQUIPMENT ROUTE SELECTION ACROSS MULTIPLE MOBILE COMMUNICATION TECHNOLOGIES

TECHNICAL FIELD

The subject application is related to wireless communication systems, and, for example, to routing of wireless communication network traffic.

BACKGROUND

Fifth generation (5G) mobile communications technology includes a new functionality referred to as User Equipment Route Selection Policy (URSP). URSP functionality allows 5G capable devices to configure network route selections for applications, thereby effectively steering network traffic from different applications into different network channels. Meanwhile, prior generation mobile communications technologies, e.g., long term evolution (LTE) technologies, as well as certain versions of 5G mobile communications technology itself, do not support URSP functionality. Technologies which enable the use of URSP functionality across multiple mobile communication technologies, e.g., various versions of 5G as well as LTE, are therefore desired.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
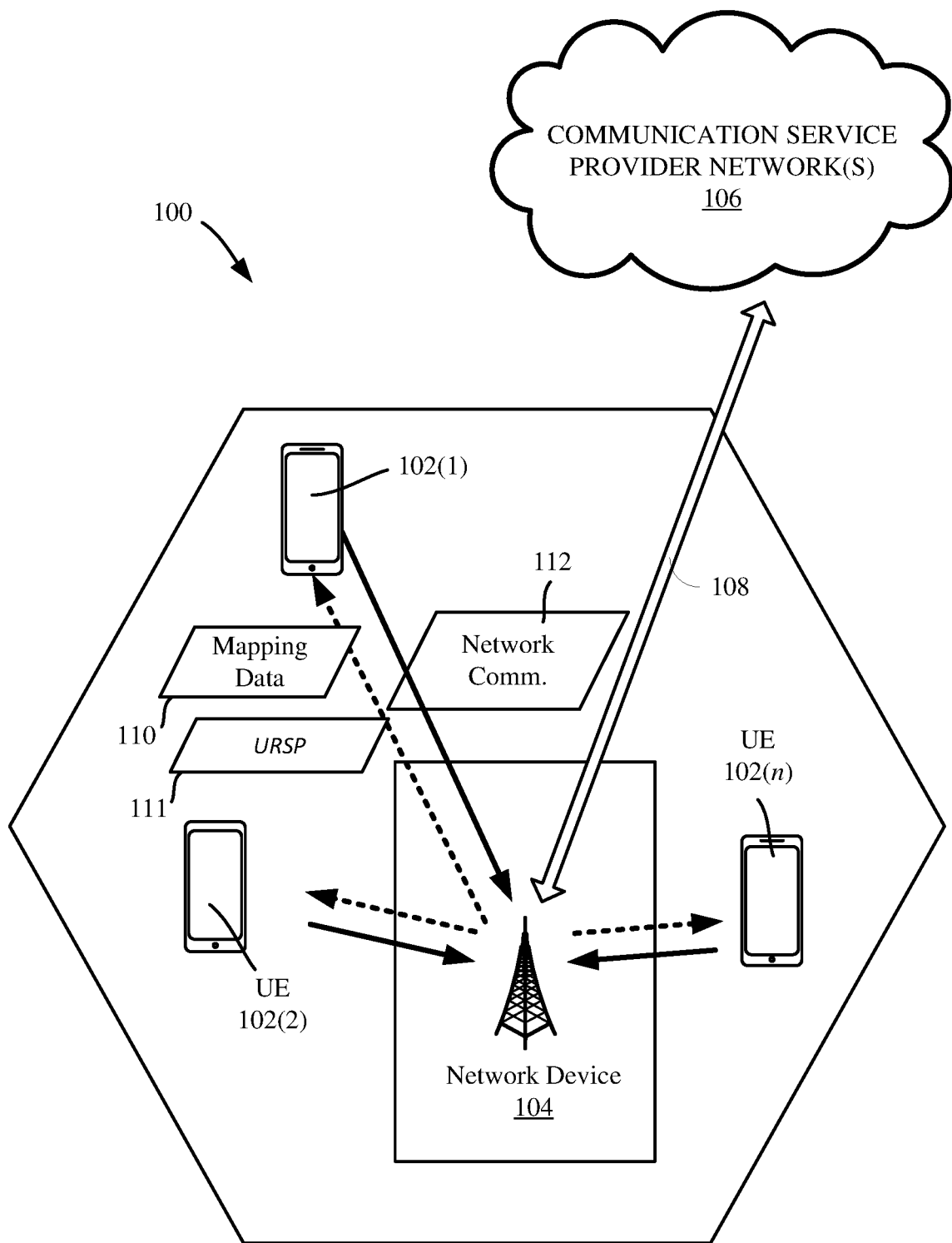
FIG. 1 illustrates an example wireless communication system in which a network node device (e.g., network node) and user equipment (UE) can implement various aspects and implementations of the subject disclosure.

One or more aspects of the technology described herein are generally directed towards enabling user equipment to perform route selection across multiple mobile communication technologies. The term "mobile communication technologies" as used herein refers to, for example, any version of fifth generation (5G) mobile communications technology, such as 5G Core or 5G Option 3x, as well other mobile communications technologies, such as long term evolution (LTE). User equipment route selection refers to specifying, by the user equipment (such as a mobile phone or other communication device), information which affects the way the user equipment's network communications are handled by a communication network as the communications travel to their destination. User equipment route selection across multiple mobile communication technologies therefore enables certain user equipment route selection capabilities whether the user equipment is connected to, e.g., a 5G Core network, a 5G Option 3x network, or a LTE network.

Some example embodiments of this disclosure enable URSP functionality over 5G Core as well as additional mobile communication technologies other than 5G Core. 5G user equipment which is built to use URSP functionality when connected to a 5G network can thus also use URSP functionality when connected to non-5G networks, such as 5G Option 3x and LTE networks.

It should be understood that any of the examples and terms used herein are non-limiting. For instance, the examples are based on 5G communications between a user equipment exemplified as a smartphone or the like and network devices; however virtually any communications devices can benefit from the technology described herein, and/or their use in different spectrums can likewise benefit. Thus, any of the embodiments, aspects, concepts, structures, functionalities or examples described herein are non-limiting, and the technology can be used in various ways that provide benefits and advantages in radio communications in general.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), fifth generation core (5G Core), fifth generation option 3x (5G Option 3x), high speed packet access (HSPA), Z-Wave, Zigbee and other 802.XX wireless technologies and/or legacy telecommunication technologies.

FIG. 1 illustrates an example wireless communication system 100 in accordance with various aspects and embodiments of the subject disclosure. In one or more embodiments, the system 100 can comprise one or more user equipment (UEs) 102(1)-102(n), which can have one or more antenna panels having vertical and horizontal elements. A user equipment such as the UE 102(1) can be a mobile device such as a cellular phone, a smartphone, a tablet computer, a wearable device, a virtual reality (VR) device, a heads-up display (HUD) device, a smart car, a machine-type communication (MTC) device, and the like. UE 102 can also refer to any type of wireless device that communicates with a radio network node in a cellular or mobile communication system. Examples of a user equipment such as the UE 102(1) can be target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. A user equipment can also comprise IoT ("internet of things") devices that communicate wirelessly. In various embodiments, system 100 is or comprises a wireless communication network serviced by one or more wireless communication network providers. In example embodiments such as in FIG. 1, a UE can be communicatively coupled via a network node device 104 a wireless communication network (e.g., communication service provider network(s) 106). All network communications sent between the UEs 102(1)-102(n) is represented by communication traffic 108.

The non-limiting term network node (or radio network node) is used herein to refer to any type of network node such as the network device 104 and/or connected to other network node, network element, or another network node from which the a user equipment such as the UE 102(1) can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network device 104) can comprise but are not limited to: NodeB devices, base station (BS) devices, access point (AP) devices, and radio access network (RAN) devices. The network device 104 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 106 can be referred to as a gNodeB device.

Wireless communication system 100 can employ various cellular technologies and modulation schemes to facilitate wireless radio communications between devices (e.g., the UEs 102(1)-102(n) and the network device 104). For example, system 100 can operate in accordance with a UMTS, long term evolution (LTE), fifth generation core (5G Core), fifth generation option 3x (5G Option 3x), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC.

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

To avoid redundant illustrations, FIG. 1 will be used herein to illustrate several different example wireless communication systems. These will be referred to as a 5G Core embodiment of FIG. 1, a 5G Option 3x embodiment of FIG. 1, and a LTE embodiment of FIG. 1. Thus for example, as UE 102(1) travels from place to place, UE 102(1) can first engage in first communications with, e.g., a 5G Core embodiment of FIG. 1, next engage in second communications with, e.g., a 5G Option 3x embodiment of FIG. 1, and next engage in third communications with, e.g., a LTE embodiment of FIG. 1.

In FIG. 1, as described herein, a user equipment (e.g., 102(1)) is configured to receive a URSP 111 and mapping data 110. When sending network communications 112 on behalf of applications executing at UE 102(1), the UE 102(1) can include routing information to specify how the network communications 112 will be handled by communication service provider networks 106. According to aspects of this disclosure, routing information included by UE 102(1) can depend on the type of mobile communications technology implemented by communication service provider networks 106.

For example, in a 5G Core embodiment of FIG. 1, UE 102(1) can include a first network name, e.g., a first Data Network Name (DNN) as can be specified in the URSP 111, in first communications 112 originated by an application executing on the UE 102(1) during a first communication from the UE 102(1) via the first (in this example, the 5G) mobile communications technology. The 5G Core embodiment of FIG. 1 can receive the first communications 112 and route them accordingly.

In response to a physical displacement of the UE 102(1) to an LTE network area, the UE 102(1) can route network communications 112 using an LTE routing technique. In a LTE embodiment of FIG. 1, UE 102(1) can access the mapping data 110 to lookup a second network name, e.g., an Access Point Name (APN), and UE 102(1) can include the applicable APN in second communications 112 originated by the application executing on the UE 102(1) during a second communication from the UE 102(1) via the second (in this example, the LTE) mobile communications technology.

Similarly, in response to a physical displacement of the UE 102(1) to a 5G Option 3x network area, the UE 102(1) can route network communications 112 using a 5G Option 3x routing technique. The 5G Option 3x routing technique can be substantially similar to the LTE technique described above.

URSP functionality allows 5G Core (also referred as 5G Next Gen Core NGC) capable devices to have a configurable setting such that traffic from certain applications on the device, as can be identified by Operating System ID (OSId) and/or Operating System App ID (OSAppID) type identifiers, can be routed to a protocol data unit (PDU) session with a specified Single Network Slice Selection Assistance Information (S-NSSAI) and DNN.

This 5G Core capability is very useful to solve the following example problem: In LTE 3GPP standards, the device capability to map OSId/OSAppID to APNs in a flexible and configurable way did not exist. Therefore, when certain traffic flow is to be treated differently, e.g., by applying different routing or policy/charging/QoS treatment, the communication service provider networks 106 were relied on to identify and filter the traffic flow using three tuples—Destination IP address, Port, and protocol.

However, using IP addresses to selectively detect and identify a certain application traffic flow is not always feasible. For example, in a smart phone scenario, differentiated policy treatment might be desired for a certain enterprise application "D" traffic flows. There could be hundreds of IP addresses for the servers that are related to App "D" and these addresses can be constantly changing, especially in public cloud based deployments. Or the same IP Address can serve two applications "D" and "E", and it can be desired to apply differentiated treatment to only "D".

Figure 2:
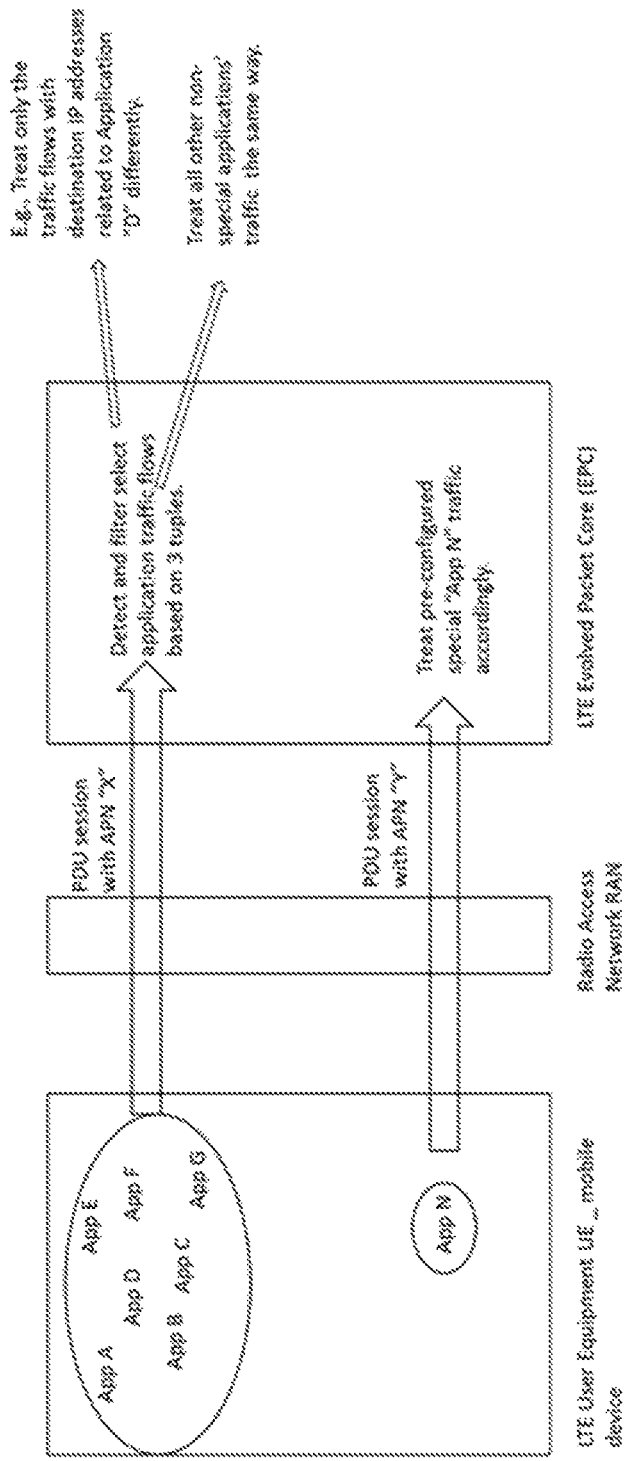
FIG. 2 is a schematic diagram illustrating example LTE network communication routing, in accordance with various aspects and implementations of the subject disclosure.

FIG. 2 is a schematic diagram illustrating example LTE network communication routing. FIG. 2 provides LTE user equipment at left, a RAN at middle, and an LTE evolved packet core (EPC) at right. The LTE user equipment includes example applications A, B, C, D, E, F, G, and N. There are certain applications, like IMS (IP Multimedia Subsystem) device vendor developed applications, that are designed to use a dedicated PDU session with a dedicated APN. In the diagram "App N" illustrates such an application, and the APN for the dedicated PDU session is APN "Y". The LTE EPC does special treatment/routing for App N due to its use of APN "Y".

However, most of the other applications (applications A, B, C, D, E, F, G) on the LTE user equipment use by default a common PDU session with a common APN assignment (APN "X"), which is the general purpose data/Internet access APN. Without using the techniques disclosed herein, it is not possible to configure some LTE devices to flexibly select a separate PDU session (with its own APN) for an application in the general pool such as App D. While different routing or policy (e.g., charging and/or QoS) rules for an application e.g., "App D" on an LTE user equipment can be done by detecting traffic in the core network using destination IP addresses, this technique is not always feasible to effectively implement different routing or policy.

Figure 3:
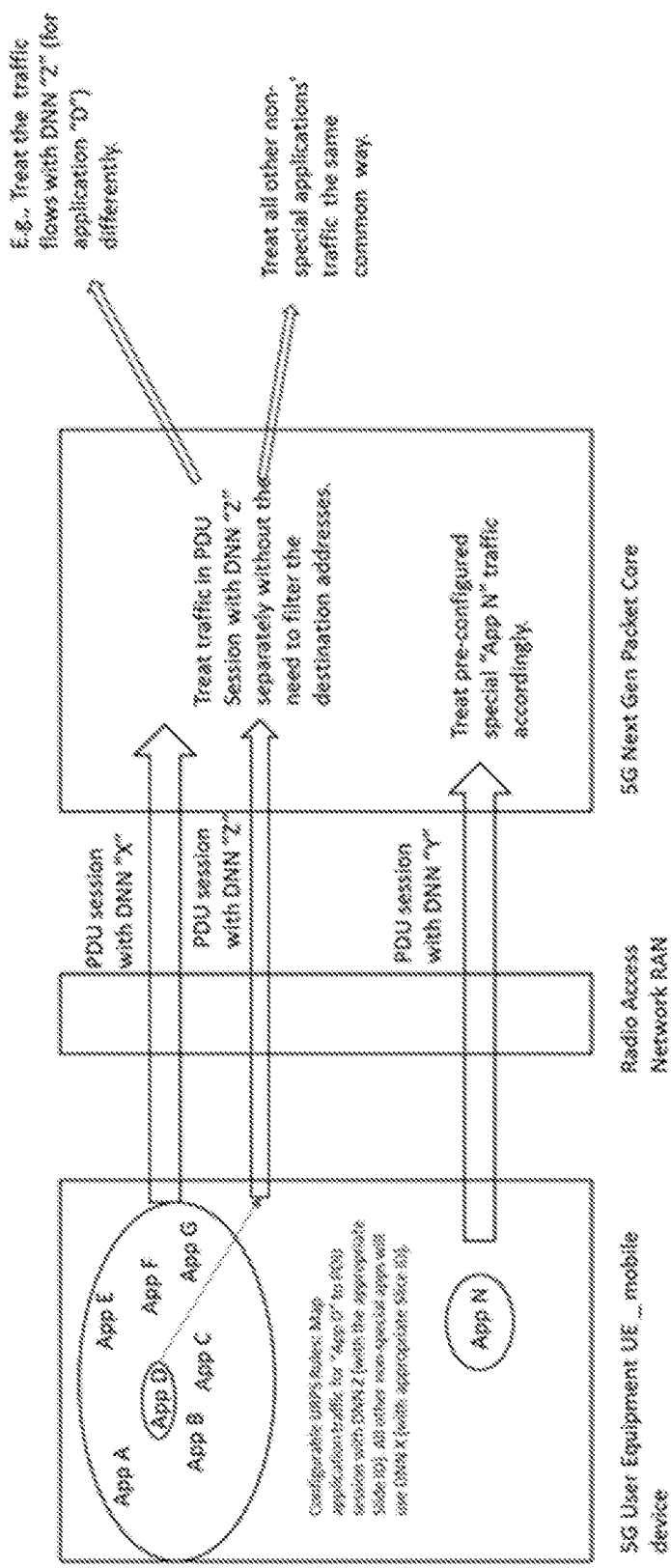
FIG. 3 is a schematic diagram illustrating example 5G Core network communication routing, in accordance with various aspects and implementations of the subject disclosure.

FIG. 3 is a schematic diagram illustrating example 5G Core network communication routing. FIG. 3 provides 5G user equipment at left, a RAN at middle, and a 5G Core at right. The 5G user equipment includes example applications A, B, C, D, E, F, G, and N. The URSP capability of 5G Core standards addresses some of the problems of, e.g., LTE. Using the URSP method, the 5G device can be flexibly configured to route the traffic belonging to a specific device application, e.g., App D, to a different PDU session, e.g., with DNN "Z", which is separate from the regular generic data traffic PDU session, with DNN "X". The traffic for App D can be isolated and tagged differently by the device using, e.g., a unique combination of S-NSSAI (Single Network Slice Selection Assistance Information)/DNN (Data Network Name) information. Slice information is a new capability that did not exist in LTE. DNN is the 5G equivalent of LTE APN. Multiple DNNs can optionally be grouped in 5G network Slices.

The 5G Core network can apply differentiated routing and policy treatment for the traffic coming from the PDU session with the specific Slice/DNN information, e.g., routing traffic to DNN "Z", without the need to match and filter using the three tuples information as described herein.

Standards for the 5G Core devices do not define whether, or how, URSP functionality can be implemented for devices which need to function on LTE only coverage areas, when 5G Core radio coverage is not available in a specific area. The URSP methods of mapping and routing certain select device application traffic to specific PDU sessions do not exist in LTE. Moreover, when the 5G Core device is in LTE only coverage, the device may not be able to acquire URSP settings and updates from the network. This inhibits the ability to use the 5G URSP capability in 5G devices in LTE only coverage areas.

Another capability of URSP is to map and route the application traffic using DNN info provided by the application. That is, the application on the device can optionally signal to the device operating system what DNN should be used for the application. The URSP rules can be used to match and allow that request. In some aspects of this disclosure, these 5G URSP capabilities can be extended to implement URSP type functionality in LTE only coverage areas, or in 5G Option 3x only coverage areas. Furthermore, as will be described further herein, techniques disclosed herein can be used to extend URSP type functionality to LTE only devices, and to enable 5G network slicing capabilities in LTE.

Figure 4:
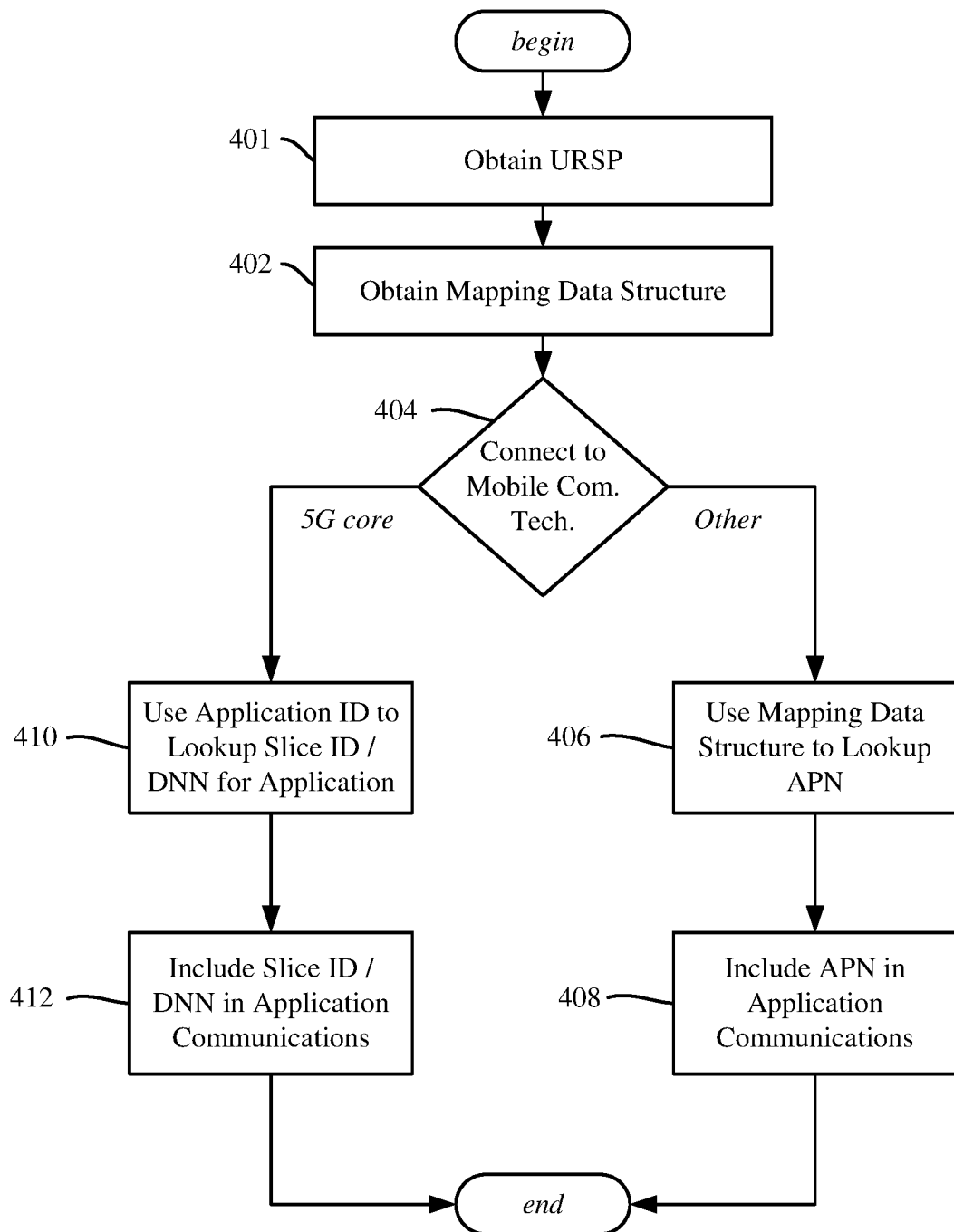
FIG. 4 is a flow chart illustrating example user equipment operations in connection with route selection across multiple mobile communication technologies, in accordance with various aspects and implementations of the subject disclosure.

FIG. 4 is a flow chart illustrating example user equipment operations in connection with route selection across multiple mobile communication technologies. At operation 401, the user equipment obtains a URSP, e.g., referring to FIG. 1, UE 102(1) can obtain URSP 111 via the network device 104. In some embodiments, URSP 111 can be pre-configured in the 5G UE 102(1), or URSP 111 can be downloaded to UE 102(1) by a 5G Core network during UE 102(1) registration. URSP rules can map application identifiers, such as OSId and OSAppID, to DNNs. URSP rules can furthermore include network slice IDs (S-NSSAI slice IDs) which are used in 5G.

At operation 402, the user equipment obtains a mapping data structure, e.g., referring to FIG. 1, UE 102(1) can obtain mapping data 110. In some embodiments, mapping data 110 can map DNNs (used in 5G Core communications) to APNs (used in LTE and 5G Option 3x communications). The mapping data 110 can for example define one to one matching between DNNs that are used to differentiate traffic based on URSP rules, and APNs used in LTE. It is possible in some circumstances to use a same DNN name as APN name, but it is not necessary, in particular when there is one to one mapping between the select DNNs and their LTE equivalent APNs.

At operation 404, UE 102(1) connects to a communications network which adapted to employ a particular mobile communications technology, e.g., 5G Core, 5G Option 3x, or LTE. When the network is 5G Core, UE 102(1) can perform route selection using URSP as intended for 5G Core, for example by performing operations 410 and 412. However, when the network is other than 5G Core, e.g., LTE or 5G Option 3x, UE 102(1) can perform the alternative route selection operations 406 and 408.

At operations 410 and 412, UE 102(1) performs route selection using URSP as intended for 5G Core. An application executing at UE 102(1) originates network traffic to be sent from UE 102(1). At operation 410, UE 102(1) uses an Application ID for the originating application, such as an OSId/OSAppID, to lookup a corresponding network slice ID and/or DNN in URSP 111. At operation 412, UE 102(1) includes the corresponding network slice ID and/or DNN in outgoing application communications.

Operations 406 and 408 are performed by UE 102(1) to accomplish route selection when network is other than 5G Core, e.g., LTE or 5G Option 3x, UE 102(1). Operations 406 and 408 enable UE 102(1) to maintain URSP rules in URSP 111 even when the UE 102(1) is, e.g., in LTE only coverage. Operations 406 and 408 are initiated when an application executing at UE 102(1) originates network traffic to be sent from UE 102(1).

At operation 406, UE 102(1) uses the mapping data structure, e.g., mapping data 110, to lookup an APN to include in outgoing application communications. In some embodiments, UE 102(1) can ignore network slice information in the URSP 111, and UE 102(1) can use the DNN portion of URSP rules to identify a DNN for the application, then lookup a corresponding APN that is one to one mapped to the DNN in the mapping data 110. The slice ID aspect of URSP rules can optionally be ignored since it is not supported by LTE networks. At operation 408, UE 102(1) includes the corresponding APN in outgoing application communications.

A number of variations of FIG. 4 can be implemented in some embodiments. For example, in some scenarios, UE 102(1) may be unable to obtain URSP 111 at step 401, for example, because UE 102(1) may not have had any recent opportunities to connect to a 5G Core network and download URSP 111. UE 102(1) may in fact have never connected to a 5G Core network if for example UE 102(1) registers first time to a network in LTE only coverage. In such scenarios, UE 102(1) can nonetheless obtain the mapping data structure it needs to do LTE route selection.

In one example, UE 102(1) can be pre-configured with URSP 111, thereby eliminating the need to acquire URSP 111 over a 5G Core network connection. UE 102(1) can eventually update URSP rules when UE 102(1) enters 5G NGC coverage.

In another example, UE 102(1) can leverage a 3GPP LTE standards capability, similar to 5G URSP functionality, called access network discovery and selection function (ANDSF) to obtain matting data sufficient to configure the UE 102(1). ANDSF allows the LTE core network to download configuration to the UE 102(1) to map different applications to different access networks, such as Wifi vs. 3GPP mobile access. ANDSF capability can be enhanced to furthermore include application ID to APN mapping data. The application ID to APN mapping data included in ANDSF can be used as the mapping data structure at operation 406, thereby enabling at least a subset of 5G URPS capabilities for the 5G UE 102(1) on LTE networks.

Embodiments using employing enhanced ANDSF can also enable URSP type routing selection functionality in non-5G Core devices, such as LTE only or 5G Option 3x devices. The benefits of using an application ID on the device, rather than IP address based filtering in the communication network, can be applied to LTE or 5G Option 3x devices that implement the ANDSF enhancement.

In a further example, when applications are pre-loaded to the UE 102(1), the applications come with certain authorized pre-configurations related to UE 102(1) capabilities that the applications can use, such as access to GPS location info, access to contacts info, access to messaging applications, etc. Similarly, when the end user of UE 102(1) downloads an application from an app store, the UE 102(1) operating system will ask the end user, during the installation process, to authorize the application to access requested capabilities. These authorizations can be applied to enable route selection, e.g., by either pre-configuring or requesting application authorizations to use a special APN. Such authorizations to use special APNs can optionally be stored in a mapping data structure and used at operation 406. UE 102(1) can process one to one DNN to APN mapping data provided for the application when the UE 102(1) is in non 5G Core coverage.

In some embodiments, URSP rules at UE 102(1) cay be modified by or on behalf of applications at UE 102(1). For example, pre-loaded applications can include defined URSP rules, and applications downloaded by the end user can request authorization to modify the URSP rules should the application require specialized routing selection.

The methods illustrated in FIG. 4 are valid when a 5G Core capable UE 102(1) is in a 5G Core coverage are as well as a 5G Option 3x coverage area without 5G NGC coverage, or a LTE coverage area. 5G URSP functionality is not presently supported in 5G Option 3X coverage areas where 5G Core coverage does not exist. Furthermore, many initial 5G deployments will be based on 5G Option 3x topology, in which 5G radio is used but LTE signaling and LTE core network supports the 5G radio and 5G Option 3x devices. Aspects of this disclosure can therefore operate in versions of 5G, such as 5G Option 3x coverage, in similar fashion as operations in LTE only coverage areas.

Some embodiments can furthermore support use of 5G Core network slicing functionality in non-5G Core networks. Network slicing functionality is a new and significant functionality that does not exist in LTE networks. In order to support network slicing functionality in LTE and other non-5G Core networks, mapping data structures can be used at operation 406, which allow one to one mapping of 5G network slices to LTE APNs, such that LTE APN based network segmentation and differentiated traffic treatment is employed when the UE 102(1) is in a non-5G Core coverage area. That is, mapping data structure can one to one map 5G S-NSSAI and DNN combinations to a LTE APNs. This allows for LTE interworking with the generic 5G network slicing capability, in addition to interworking for 5G URSP functionality.

In an aspect, the UE 102(1) maintains PDU session continuity during hand over from 5G Core to LTE, and vice versa. The 3GPP standards describe LTE to 5G interworking, and the 3GPP specifications can be followed to maintain PDU sessions specifically created for certain select applications when the UE 102(1) moves from 5G Core to LTE and vice versa.

Figure 5:
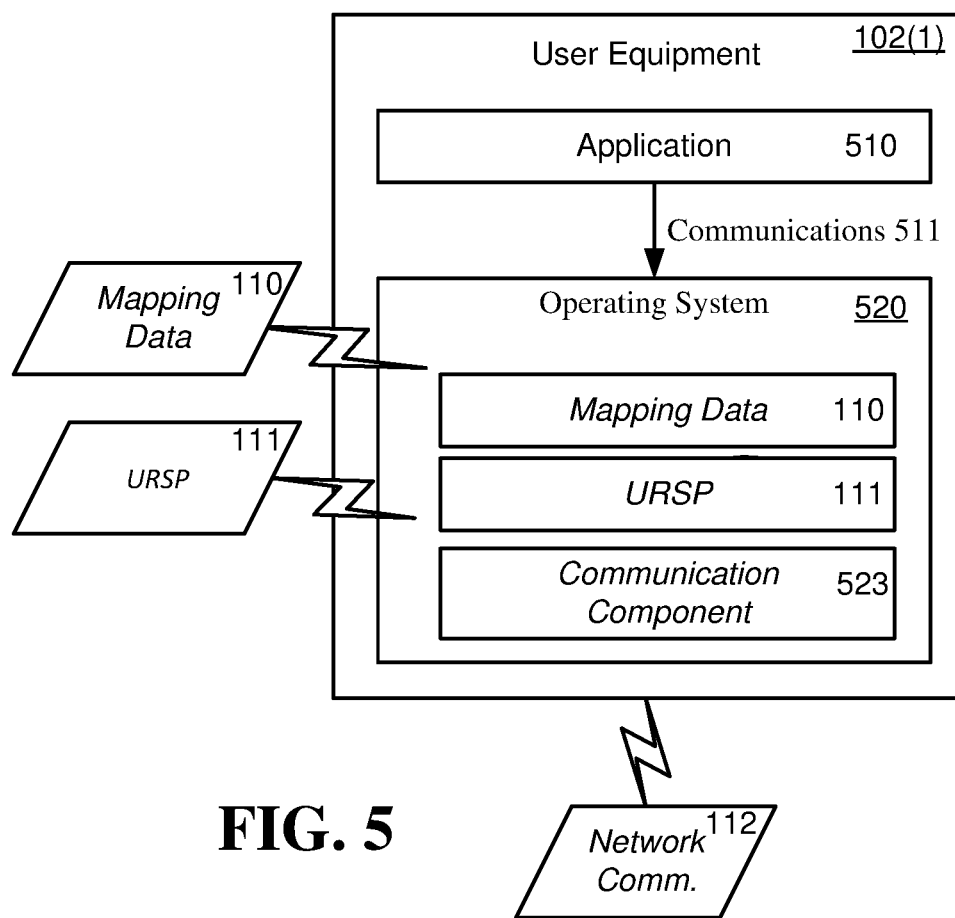
FIG. 5 illustrates an example block diagram of an example user equipment operable to perform route selection across multiple communication technologies, in accordance with various aspects and implementations of the subject disclosure

FIG. 5 illustrates an example block diagram of an example user equipment operable to perform route selection across multiple communication technologies. Example UE 102(1) includes application 510 and operating system 520. Operating system 520 includes mapping data 110, URSP 111, and a communication component 523. The UE 102(1) is illustrated as obtaining mapping data 110 and URSP 111, and sending network communications 112.

In some embodiments, UE 102(1) can perform the various operations described in connection with FIG. 4. For example, operating system 520 can obtain URSP 111 and mapping data 110, and store these locally at UE 102(1) for subsequent access by operating system 520 when sending network communications 112 on behalf of application 510. Application 510 can originate communications 511, which can be packaged and sent to the network by the communication component 523.

Communication component 523 can implement URSP 111 directly when the UE 102(1) is connected to a 5G Core network, in order to perform route selection on behalf of application 510. Communication component 523 can implement URSP 111 indirectly when the UE 102(1) is connected to a non-5G Core network, such as LTE or 5G Option 3x, in order to perform route selection on behalf of application 510 under those circumstances. As will be understood from this disclosure, communication component 523 can implement URSP 111 indirectly, e.g., by first using an application ID to look up a DNN in URSP 111, then using the DNN to lookup an APN in mapping data 110. In another example embodiment, communication component 523 can use an application ID to lookup an APN in mapping data 110. In a still further example embodiment, communication component 523 can use an application ID to look up a network slice ID and DNN combination in URSP 111, then use the network slice ID and DNN combination to lookup an APN in mapping data 110.

Figure 6:
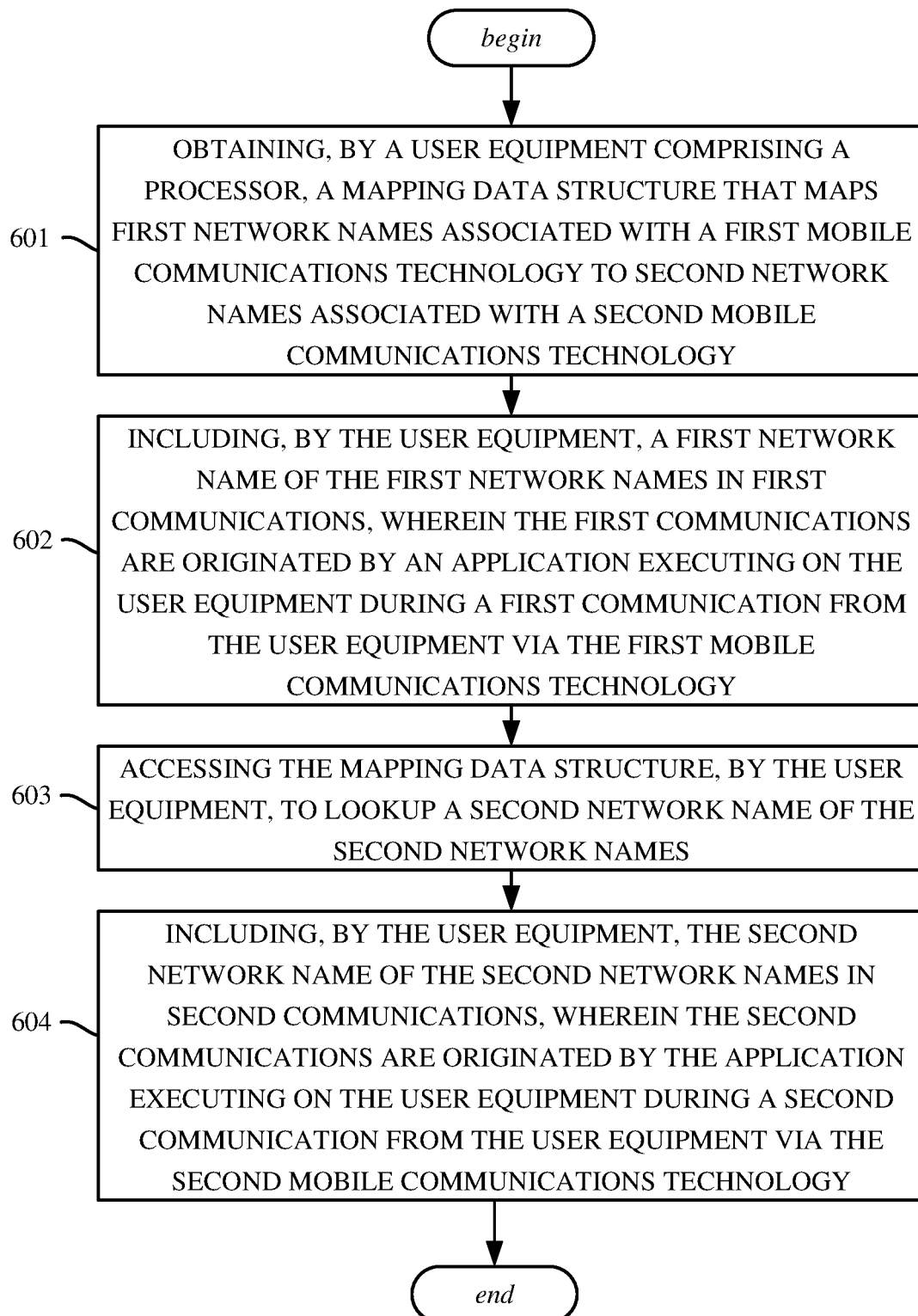
FIG. 6 is a flow diagram representing example operations that a user equipment can perform to implement route selection across multiple mobile communication technologies, in accordance with various aspects and implementations of the subject disclosure.

One or more aspects, such as implemented in a machine-readable storage medium, comprising executable instructions that, when executed by a processor, facilitate performance of operations, are represented in FIG. 6. Example operations comprise operation 601, which represents obtaining, by a user equipment comprising a processor, a mapping data structure that maps first network names associated with a first mobile communications technology to second network names associated with a second mobile communications technology. For example, with reference to FIG. 1, UE 102(1) can obtain mapping data 110 including the mapping data structure. The mapping data structure can map, for example, first network names such as DNNs associated with a first mobile communications technology such as 5G Core, to second network names such as APNs associated with a second mobile communications technology, such as LTE or 5G Option 3x.

Operation 602 can be performed for example when UE 102(1) is connected to a 5G Core network. Operation 602 represents including, by the user equipment, a first network name (such as a DNN) of the first network names (such as DNNs) in first communications, e.g., firs, wherein the first communications are originated by an application executing on the user equipment during a first communication from the user equipment via the first mobile communications technology. For example, with reference to FIG. 1, UE 102(1) can include a first network name, such as a DNN, of the first network names (such as DNNs) in first communications of network communications 112. The first communications of network communications 112 are originated by an application, e.g., application 510, executing on the UE 102(1) during a first communication from the UE 102(1) via the first (5G) mobile communications technology.

In some embodiments, operation 602 can include looking up, by the user equipment, the first network name of the first network names by referencing an identifier associated with the application. For example, UE 102(1) can look up a DNN in URSP 111 by referencing an application ID in the URSP 111.

Operations 603 and 604 can be performed for example when UE 102(1) is connected to a LTE or 5G Option 3x network. Operation 603 represents accessing the mapping data structure, by the user equipment, to lookup a second network name of the second network names. For example, with reference to FIG. 1, UE 102(1) can access mapping data 111 including mapping data structure stored locally at UE 102(1), to lookup a second network name, e.g., an APN, of the second network names, namely the APNs in the mapping data 111.

Operation 604 represents including, by the user equipment, the second network name of the second network names in second communications, wherein the second communications are originated by the application executing on the user equipment during a second communication from the user equipment via the second mobile communications technology. For example, with reference to FIG. 1, UE 102(1) can include the APN found in operation 603 in second communications of network communication 112, wherein the second communications are originated by the application, e.g., application 510, executing on the UE 102(1) during a second communication from the UE 102(1) via the second mobile communications technology (LTE or 5G Option 3x).

In embodiments where UE 102(1) moves between multiple versions of 5G networks, 5G Core is referred to herein as first version of a 5G mobile communications technology, and 5G Option 3x is referred to herein a second version of the fifth generation mobile communications technology.

Furthermore, as will be appreciated from this disclosure operations 602 and 602, respectively, may comprise including, by the user equipment at operation 602, a network slice identifier of network slice identifiers with the first network name of the first network names in the first communications, and ignoring, by the user equipment at operation 604, the network slice identifiers during the second communication from the user equipment via the second mobile communications technology. For example, UE 102(1) can include network slice identifiers along with DNNs when engaging in 5G Core communications, and UE 102(1) can ignore network slice identifiers during LTE communications.

Some embodiments of FIG. 6 can also include maintaining, by the user equipment, a portable data unit session throughout a handover of the user equipment from a first network device associated with the first mobile communications technology to a second network device associated with the second mobile communications technology. For example, UE 102(1) can maintain a PDU session as UE 102(1) moves from a 5G Core network to a LTE or 5G Option 3x network, or vice versa.

Figure 7:
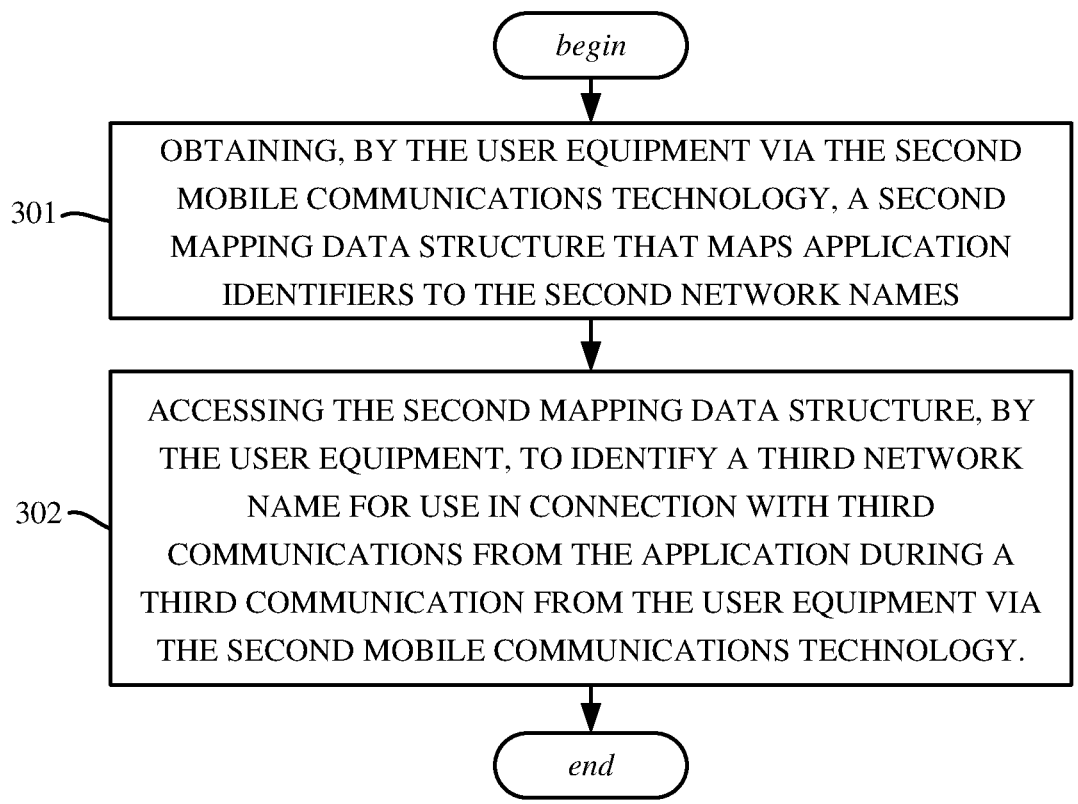
FIG. 7 is a flow diagram representing example operations of a user equipment when the user equipment obtains a second mapping data structure that is useful in particular when URSP rules are not available at the user equipment, in accordance with various aspects and implementations of the subject disclosure.

One or more aspects, such as implemented in a machine-readable storage medium, comprising executable instructions that, when executed by a processor, facilitate performance of operations, are represented in FIG. 7. Example operations comprise operation 701, which represents obtaining, by the user equipment via the second mobile communications technology, a second mapping data structure that maps application identifiers to the second network names. For example, with reference to FIG. 1, UE 102(1) can obtain, via an LTE or 5G Option 3x network, mapping data 110 including the second mapping data structure. The second mapping data structure can map, for example, application IDs to APNs. In some cases, the second mapping data structure can be obtained using enhanced ANDSF as described herein.

Operation 702 represents accessing the second mapping data structure, by the user equipment, to identify a third network name for use in connection with third communications from the application during a third communication from the user equipment via the second mobile communications technology. For example, with reference to FIG. 1, UE 102(1) can accessing the second mapping data structure obtained at operation 701 to identify a third network name, such as an APN which can be different from the APN identified at operation 603, for use in connection with third communications (of network communications 112) from the application 510 during a third communication from the UE 102(1) via the second (LTE or 5G Option 3x) mobile communications technology.

Figure 8:
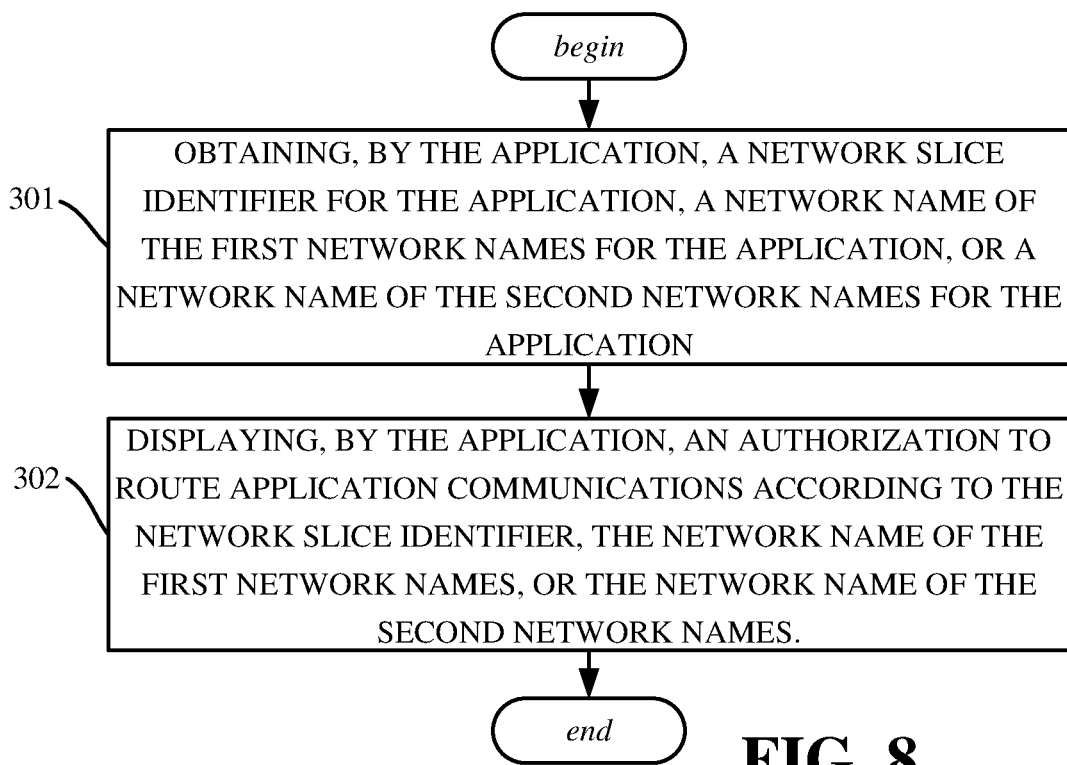
FIG. 8 is a flow diagram representing example operations of a user equipment when an application at the user equipment obtains its own mapping data for use in routing selection, in accordance with various aspects and implementations of the subject disclosure.

One or more aspects, such as implemented in a machine-readable storage medium, comprising executable instructions that, when executed by a processor, facilitate performance of operations, are represented in FIG. 8. Example operations comprise operation 801, which represents obtaining, by the application, a network slice identifier for the application, a network name of the first network names for the application, or a network name of the second network names for the application. For example, with reference to FIG. 1, an application 510 at UE 102(1) can obtain mapping data 110 including a network slice identifier for the application 510, a network name (e.g., a DNN) of the first network names (e.g., the DNNs) for the application 510, or a network name (e.g., an APN) of the second network names (APNs) for the application 510. The application 510 can store (or cause the operating system 520 to store) the application-obtained mapping information in, e.g., the mapping data structure stored at UE 102(1).

Operation 802 represents displaying, by the application, an authorization to route application communications according to the network slice identifier, the network name of the first network names, or the network name of the second network names. For example, with reference to FIG. 1, application 510 can display an authorization to route application communications according to the application-obtained network slice identifier, DNN, or APN.

Figure 9:
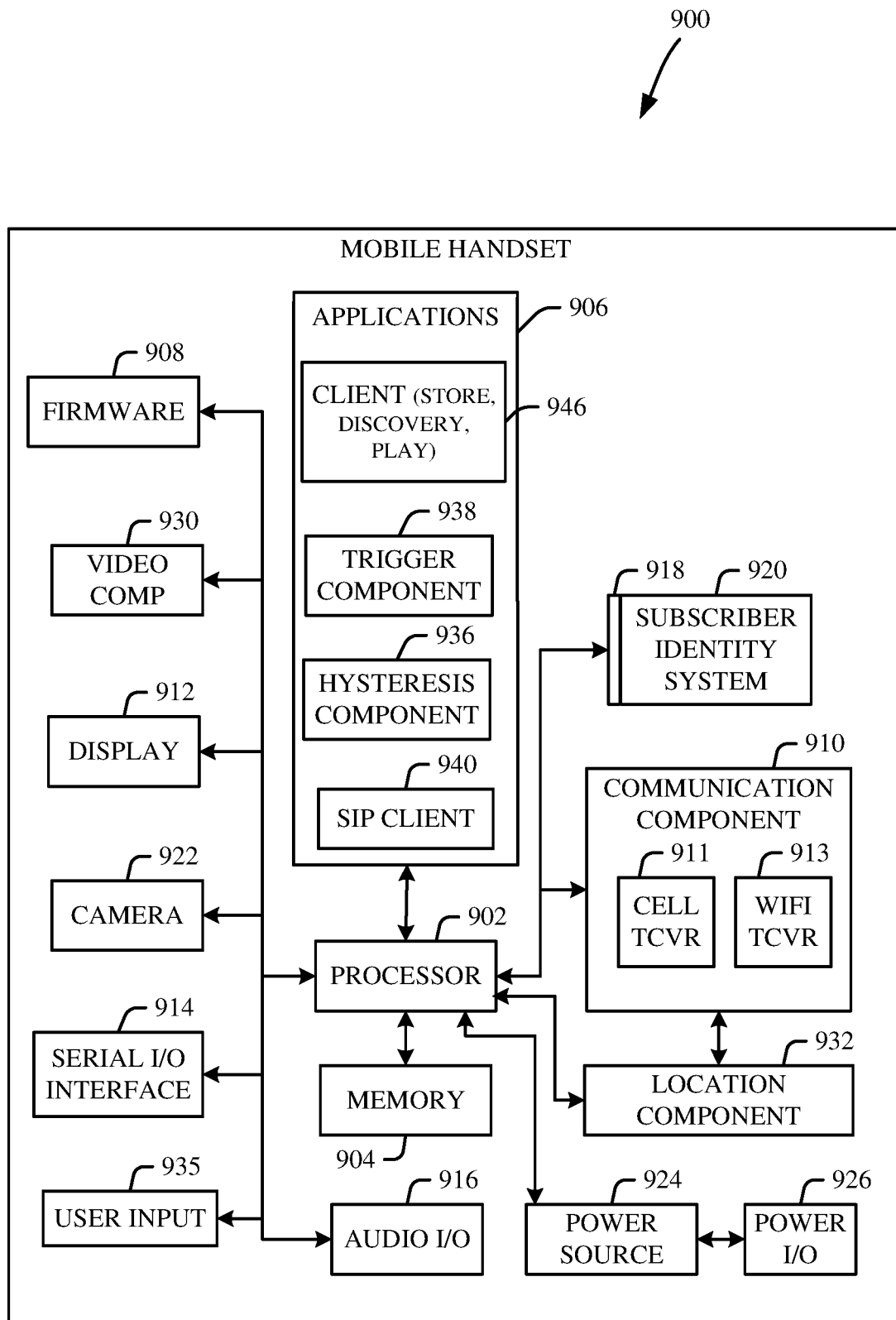
FIG. 9 illustrates an example block diagram of an example mobile handset operable to engage in a system architecture that facilitates wireless communications according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 994) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Aspects of this disclosure may generally be implemented by one or more computers operable to engage in a system architecture that facilitates wireless communications according to one or more embodiments described herein. A computer can provide networking and communication capabilities between a wired or wireless communication network and a server (e.g., Microsoft server) and/or communication device. In order to provide additional context for various aspects thereof, following discussion is intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below is but one example of a computing device.

In order to provide a context for the various aspects of the disclosed subject matter, the following discussion is intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. Aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Computers can operate in a networked environment using logical connections to one or more remote computers, such as remote computer(s). Remote computer(s) can be a personal computer, a server, a router, a network PC, cloud storage, cloud service, a workstation, a microprocessor based appliance, a peer device, or other common network node and the like, and typically includes many or all of the elements described relative to computer.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
   obtaining, by a user equipment comprising a processor, a mapping data structure that maps first network names associated with a first mobile communications technology that supports a user route selection policy to second network names associated with a second mobile communications technology that does not support the user route selection policy, wherein the mapping data structure enables route selection for user equipment communications according to the user route selection policy when the user equipment is connected according to the second communications technology;
   sending, by the user equipment, while the user equipment is connected according to the first mobile communications technology, a first communication using the user route selection policy, wherein the user route selection policy specifies a first network name of the first network names, and wherein the first communication is originated by an application executing on the user equipment;
   switching, by the user equipment, to being connected according to the second mobile communications technology that does not support the user route selection policy;
   sending, by the user equipment, a second communication via the second mobile communications technology and originated by the application executing on the user equipment, wherein the sending the second communication comprises:
      accessing the mapping data structure, by the user equipment, to lookup a second network name of the second network names corresponding to the first network name of the first network names; and
      including, by the user equipment, the second network name of the second network names in the second communication.

2. The method of claim 1, wherein the first mobile communications technology comprises a fifth generation mobile communications technology, the first network names comprise data network names, the second mobile communications technology comprises a long term evolution mobile communications technology, and the second network names comprise access point names.

3. The method of claim 1, wherein the first mobile communications technology comprises a first version of a fifth generation mobile communications technology, and wherein the second mobile communications technology comprises a second version of the fifth generation mobile communications technology.

4. The method of claim 1, wherein the mapping data structure maps the first network names to the second network names on a one-to-one basis.

5. The method of claim 1, further comprising looking up, by the user equipment, the first network name of the first network names by referencing an identifier associated with the application.

6. The method of claim 1, wherein the mapping data structure is a first mapping data structure, and the method further comprising:
   obtaining, by the user equipment via the second mobile communications technology, a second mapping data structure that maps application identifiers to the second network names; and
   accessing the second mapping data structure, by the user equipment, to identify a third network name for use in connection with third communications from the application during a third communication from the user equipment via the second mobile communications technology.

7. The method of claim 1, further comprising:
   obtaining, by the application, a network slice identifier for the application, a first network name of the first network names for the application, and a second network name of the second network names for the application, and displaying, by the application, an authorization to route application communications according to the network slice identifier, the first network name of the first network names, and the second network name of the second network names.

8. The method of claim 1, further comprising including, by the user equipment, a network slice identifier of network slice identifiers with the first network name of the first network names in the first communications, and ignoring, by the user equipment, the network slice identifiers during the second communication via the second mobile communications technology.

9. The method of claim 1, wherein the mapping data structure maps combinations of network slice identifiers and the first network names to the second network names.

10. The method of claim 1, wherein the obtaining the mapping data structure is performed during a registration of the user equipment with a network device associated with a mobile communications provider identity, or during a pre-configuration of the user equipment, prior to the registration of the user equipment with the network device.

11. The method of claim 1, further comprising maintaining, by the user equipment, a portable data unit session throughout a handover of the user equipment from a first network device associated with the first mobile communications technology to a second network device associated with the second mobile communications technology.

12. A user equipment device, comprising:
a processor; and
a memory that stores executable instructions that, when executed by the processor, facilitate performance of operations configured to select routes for user equipment communications in different mobile communications technology environments, the operations comprising:
  obtaining a mapping data structure, which maps first network names associated with a first mobile communications technology that supports a user route selection policy to second network names associated with a second mobile communications technology that does not support the user route selection policy;
  while the user equipment is connected according to the first mobile communications technology, sending first communications originated by an application executing on the user equipment device using the user route selection policy, wherein the user route selection policy specifies a first one of the first network names; and
  switching to being connected according to the second mobile communications technology that does not support the user route selection policy; and
  sending a second communication via the second mobile communications technology and originated by the application executing on the user equipment, wherein the sending the second communication comprises:
    accessing the mapping data structure to identify a second one of the second network names; and
    including the second one of the second network names in the second communication.

13. The user equipment device of claim 12, wherein the first mobile communications technology comprises a fifth generation mobile communications technology, and the second mobile communications technology comprises a long term evolution mobile communications technology.

14. The user equipment device of claim 12, wherein the first mobile communications technology comprises a first version of a fifth generation mobile communications technology, and wherein the second mobile communications technology comprises a second version of the fifth generation mobile communications technology.

15. The user equipment device of claim 12, wherein the mapping data structure maps the first network names to the second network names on a one-to-one basis.

16. The user equipment device of claim 12, wherein the operations further comprise identifying the first one of the first network names by referencing an identifier associated with the application.

17. The user equipment device of claim 12, wherein the operations further comprise including an identifier from a group of network slice identifiers with the first one of the first network names in the first communications, and ignoring the group of network slice identifiers during the second communication from the user equipment device via the second mobile communications technology.

18. The user equipment device of claim 12, wherein the obtaining the mapping data structure is done during a registration of the user equipment device with a mobile communications provider or during a pre-configuration of the user equipment device prior to the registration of the user equipment device with the mobile communications provider.

19. A non-transitory machine-readable medium, comprising executable instructions that, when executed by a processor of a user equipment, facilitate performance of operations, the operations comprising:
  obtaining, by the user equipment, a mapping data structure that maps first network names to second network names, wherein the first network names are associated with a first mobile communications technology that supports a user route selection policy, and wherein the second network names are associated with a second mobile communications technology that does not support the user route selection policy;
  while the user equipment is connected according to the first mobile communications technology, including at least one of the first network names, in accordance with the user route selection policy, in first communications of an application executing on a user equipment device; and
  while the user equipment is connected according to the second mobile communications technology that does not support the user route selection policy:
    accessing the mapping data structure to determine at least one of the second network names; and
    including at least one of the second network names in second communications of the application executing on the user equipment device.

20. The non-transitory machine-readable medium of claim 19, wherein the first network names comprise data network names, and the second network names comprise access point names.

* * * * *